United States Patent [19]

Fujita

[11] Patent Number: 5,334,649
[45] Date of Patent: Aug. 2, 1994

[54] WATER BASE INK COMPOSITION

[75] Inventor: Hisanori Fujita, Osaka, Japan

[73] Assignee: Sakura Color Products Corporation, Osaka, Japan

[21] Appl. No.: 997,200

[22] Filed: Dec. 28, 1992

[30] Foreign Application Priority Data

Dec. 26, 1991 [JP] Japan ............................. 3-359882
Nov. 24, 1992 [JP] Japan ............................. 4-313142

[51] Int. Cl.$^5$ ..................... C08L 33/08; C09D 11/16
[52] U.S. Cl. ............................. 524/558; 524/549; 524/555; 523/160; 523/161
[58] Field of Search ............... 524/555, 558, 549; 523/160, 161

[56] References Cited

U.S. PATENT DOCUMENTS

| | | | |
|---|---|---|---|
| 4,013,607 | 3/1977 | Dwyer et al. | 524/428 |
| 4,260,531 | 4/1981 | Wachtel et al. | 524/389 |
| 4,686,260 | 8/1987 | Lindemann et al. | 523/222 |
| 5,004,763 | 4/1991 | Imagawa | 524/563 |

Primary Examiner—Paul R. Michl
Assistant Examiner—Olga Asinovsky
Attorney, Agent, or Firm—Wenderoth, Lind & Ponack

[57] ABSTRACT

A water base ink composition which comprises water as a solvent, a carboxyl group containing styrenic resin having an average molecular weight of 1500–30000 and an acid value of 150–300, in an amount of 2–20% by weight, a basic dye in an amount of 0.1–80 parts by weight in relation to 100 parts by weight of the styrenic resin, and an alkali which is volatile at normal temperatures in such an amount as adjusts the ink composition at a pH in the range of 6 to 8.5.

12 Claims, No Drawings

WATER BASE INK COMPOSITION

FIELD OF THE INVENTION

This invention relates to a water resistant water base ink composition, more particularly to a water base ink composition which contains a dye as a colorant and yet water resistant, and which writes on an impervious surface such as of resin or metal as wewll as on a pervious surface such as of paper, suitable for use as a designing ink, a pen writing ink, an air-brushable drawing ink, or an ink for a felt pen type writing instrument such as a so called sign pen.

BACKGROUND OF THE INVENTION

In general, the ink composition for use in writing instruments are divided into two groups: the first is an oil base or organic solvent base ink composition, and the second is a water base ink composition. The oil base ink composition has an advantage that it can write on an impervious surface such as of glass or resin as well as on a pervious surface such as of paper. However, the oil base ink composition usually contains an aromatic hydrocarbon such as xylene or toluene as a solvent, and consequently there is a fear that such a solvent might be injurious to the health. In addition, the oil base ink composition has a disadvantage that when it is used to write on paper, it permeates through the paper to the back. In turn, the water base ink composition has no such a problem as involved in the oil base ink composition, however, the water base ink composition provides writing having no water resistance, and besides it does not write on a impervious surface such as of glass or resin.

Accordingly, in the production of water base ink composition containing a dye as a colorant, the employment of a direct dye, or an additive such as a wetting agent has been proposed in order to make writing formed with a water base ink composition water resistant. There has also been proposed a water base ink composition which employs a pigment as a colorant which is originally water resistant.

However, it has been found that a water base ink composition containing a dye as a colorant provides no writing of sufficient water resistance even if it is used to write on a pervious surface such as of paper. On the other hand, with an oil base ink composition, it has been found difficult to disperse a pigment evenly in a solvent so that an oil base ink composition has a trouble in storability, and also in multicoloration.

A drawing ink for use in designing has been known which is water base and yet water resistant, and which can write on an impervious surface such as of glass or resin. The ink composition comprises an aqueous solution of shellac resin and a basic dye dissolved therein. However, the shellac resin is essentially a thermosetting resin so that when the drawing ink is left standing over a long period of time, the polymerization of shellac resin takes place to form precipitates tn the ink composition. Furthermore, when the shellac resin is hydrolyzed with an alkali to produce a resin soap in the ink composition, and then the permeability of the ink composition into paper becomes larger as time passes. Consequently, there arises a problem of change in color of writing when it is used to write on paper.

The drawing ink contains a basic dye in an amount of less than 1.0 part by weight in relation to 10 parts by weight of shellac resin. Thus, the drawing ink usually contains a dye insufficiently so that it fails to form writing of sufficient darkness when used in a felt pen type writing instrument. Moreover, when the drawing ink is left standing for a few days in the felt pen type writing instrument, it provides a faint and patchy writing, and can not be suitably used in a felt pen type writing instrument.

BRIEF SUMMARY OF THE INVENTION

It is an object of the invention to provide a water base ink composition for writing or drawing which contains no toxic solvents, and writes well on an impervious surface like an oil base ink composition as well as on a pervious surface, thereby to provide writing of sufficient water resistance, and in addition, which does not permeate through the paper to the back when being used to writs on a pervious surface such as paper.

It is a further object of the invention to provide a water base ink composition suitable for use in a felt pen type writing instrument with no change in color after storage.

According to the invention, there is provided a water base ink composition for writing or drawing which comprises water as a solvent, a carboxyl group containing styrenic resin having an average molecular weight of 1500–30000 and an acid value of 150–300, in an amount of 2–20% by weight, a basic dye in an amount of 0.1–80 parts by weight in relation to 100 parts by weight of the styrenic resin, and an alkali which is volatile at normal temperatures in such an amount as adjusts the ink composition at a pH in the range of 6 to 8.5.

DETAILED DESCRIPTION OF THE INVENTION

The ink composition of the invention is suitable for writing or drawing, more specifically, for example, suitable for use as a designing ink or an ink for a felt pen type writing instrument. Both the ink compositions are already well known in the art. The felt pen is a writing instrument which has an ink reservoir composed of felt or a bundle of fibers impregnated with ink and, a pen tip composed of felt, fiber or resin to which the ink is supplied from the reservoir by making use of capillary phenomenon, thereby permitting to write.

It is necessary that the styrenic resin is dissolved together with a basic dye as a colorant in water or the ink composition which is adjusted at a pH in the range of 6 to 8.5 by an alkali also dissolved in the ink composition. Accordingly, it is necessary that the styrenic resin has an acid value of 150–300. When the styrenic resin has an acid value of less than 150, it has not a sufficient amount of carboxyl groups to render the resin sufficiently water soluble, so that the resin has an insufficient solubility in water. It is a further reason to reduce the solubility of the styrenic resin in water that the baste dye contained in the ink composition reacts with the styrenic resin to form a salt. As above set forth, when the styrenic resin has an acid value of less than 150, a basic dye can not be dissolved in a sufficient amount in an ink composition, and consequently the ink composition provides no writing of sufficient darkness. On the other hand, when the basic dye has an acid value of more than 300, the resultant ink composition provides writing of insufficient water resistance.

It is further necessary that the styrenic resin has an average molecular weight of 1500–30000. When the styrenic resin has an average molecular weight of less than 1500, the resultant writing formed on an impervious surface such as of glass or resin has an insufficient adhesion to the surface. The use of such a resin also reduces the amount of basic dye soluble in the ink composition in relation to the resin, as is undesirable as set forth above. In turn, when the styrenic resin has an average molecular weight of more than 30000, the resultant ink composition has an excessively large viscosity, and deteriorates in the writability. In addition, the use of such a resin necessitates reducing the amount of the resin used in the ink composition, thereby undesirably to reduce the adhesion of writing on a writing surface. It is most preferred that the styrenic resin has an acid value in the range of 180 to 250 and an average molecular weight in the range of 1800 to 10000.

The carboxyl group containing styrenic resin used in the invention includes, for example, a styrene-acrylic acid resin and a partially esterified styrene-maleic acid resin.

It is preferred that the styrene-acrylic acid resin is a copolymer mainly composed of styrene and (meth)acrylic acid, and if necessary together with an ester of (meth)acrylic acid with an aliphatic alcohol of up to ten carbons or phenol, such as methyl, ethyl, butyl, hexyl, 2-ethylhexyl or phenyl ester, in such an amount as not to put the resultant copolymer at an acid value of less than 150.

It is also preferred that the partially esterified styrene-maleic acid resin is such a resin wherein the maleic acid component is half-esterified, or is a styrene-maleic acid half ester copolymer, which may have a unit structure represented by

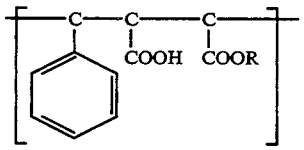

wherein R is an alkyl group usually of 1–10 carbons.

A styrene-maleic anhydride resin in which the maleic anhydride component retains the anhydride structure and a styrene-maleic acid resin in which the maleic acid component has completely free carboxyl groups have an acid value of more than 300, and accordingly are not be used in the invention.

The partially esterified styrene-maleic acid resin used in the invention may contain isobutylene components therein.

The styrene-acrylic acid resin and the partially esterified styrene-maleic acid resin used in the invention may be commercially available.

For example, there may be mentioned as such a styrene-acrylic acid resin, Johncryl 67, Johncryl 678, Johncryl 680, Johncryl 682, Johncryl 550, Johncryl 683 or Johncryl B -36 (available from S. C. Johnson & Son, Inc., U.S.A.). There may be mentioned as such a partially esterfied styrene-maleic acid resin, for example, Hairosu X-200, Hairosu X-201, Hairosu X-203, Hairosu X-205 or Hairosu X-220 (available from Seiko Kagaku K.K., Japan): or SMA resin 1440, SMA resin 2625 or SMA resin 17352 (available from ARCO Chemical K.K., Japan).

The ink composition of the invention contains the styrenic resin in an amount of 2–20% by weight. When the content of the styrenic resin is less than 2% by weight, a basic dye contained in the ink composition is accordingly reduced in the amount, to provide writing of insufficient darkness and water resistance. However, when the content of the styrenic resin is more than 20% by weight, the resultant ink composition has an excessively large viscosity, and writes bad. The preferred amount of the styrenic resin in the ink composition may be in the range of 5–15% by weight.

It is preferred that the basic dye used in the invention is such that it provides writing of sufficient darkness and contains an extender in an amount as small as possible. A commercial product may be used, and if necessary, it may be purified by extraction with alcohols.

The basic dye used in the invention may include, for example, Basic Yellow 2 (C.I. 41000), Basic Yellow 11 C.I. 48055), Basic Yellow 12 (C.I. 48065), Basic Yellow 13, Basic Yellow 14, C.I. Basic Yellow 15, C.I. Basic Yellow 21, C.I. Basic Yellow 31, Basic Yellow 36, C.I. Basic Yellow 40, C.I. Basic Yellow 65, C.I. Basic Yellow 73, C.I. Basic Orange 21 (C.I. 48035), C.I. Basic Orange 22 (C.I. 48040), C.I. Basic Orange 30, C.I. Basic Red 1 (C.I. 45160), C.I. Basic Red 12 (C.I. 48070), C.I. Basic Red 13 (C.I. 48015), C.I. Basic Red 14, C.I. Basic Red 18 (C.I. 11085), C.I. Basic Red 27, C.I. Basic Red 36, C.I. Basic Red 38, C.I. Basic Red 39, C.I, Basic Red 46, C.I. Basic Red 46:1, C.I. Basic Red 69, C.I. Basic Red 70, C.I. Basic Red 82, C.I. Basic Violet 1 (C.I. 42535), C.I. Basic Violet 3 (C.I. 42555), C.I. Basic Violet 7 (C.I. 48020), C.I. Basic Violet 8, C.I. Basic Violet 10 (C.I. 45170), C.I. Basic Violet 11 (C.I. 45175), C.I. Basic Violet 15, C.I. Basic Violet 16 (C.I. 48013), C.I. Basic Violet 27, C.I. Basic Blue 1 (C.I. 42025) , C.I. Basic Blue 3 (C.I. 51004), C.I. Basic Blue 7 (C.I. 42598), C.I. Basic Blue 9 (C.I. 52015) , C.I. Basic Blue 26 (C.I. 44045), C.I. Basic Green 1 (C.I. 42040), C.I. Basic Green 4 (C.I. 42000 ) and C.I. Basic Brown 1 (C.I.21000).

According to the invention, the basic dye is used in an amount of 0.1–80 parts by weight in relation to 100 parts by weight of the styrenic resin. When the basic dye is used in an amount of less than 0.1 part by weight in relation to 100 parts by weight of the styrenic resin, the resultant ink composition provides faint writing. When the basic dye is used in an amount of more than 100 parts by weight in relation to 100 parts by weight of the styrenic resin, the resin may undesirably precipitate in the ink composition to affect the writability. Furthermore, the ink composition may have an excessively large viscosity, and thin may also debase the writability. It is particularly preferred that the ink composition contains the basic dye in an amount of 3–50 parts by weight in relation to 100 parts by weight of the styrenic resin.

The ink composition of the invention is a water base ink composition which contains such a styrenic resin and basic dye as set forth above, arid is adjusted at a pH in the range of 6 to 8.5 by addition of an alkali thereto. When the pH is smaller than 6, the styrenic resin is not dissolved stably in the ink composition, whereas the pH is larger than 8.5, the basic dye is unstable in the ink composition, and there may take place change in color of the ink composition or precipitation of dye on account of destruction of dye. The resin used also may precipitate, or the ink composition may deteriorate on account of hydrolysis of the resin used.

The alkali used in the invention is water soluble, and volatile at normal temperatures. The alkali plays an important role in the ink composition of the invention.

Firstly, the alkali makes the ink composition alkaline to make it possible for the styrenic dye to be stably dissolved therein, and hence the basic dye in the ink composition. Secondly, when there has been formed writing with such an ink composition, and when the solvent has evaporated and the writing has been dried, the basic dye is combined with the styrenic resin to form a water insoluble colorant, thereby forming water resistant writing.

There may be mentioned as such an alkali used in the invention, for example, ammonia water or water soluble organic amine compounds such as trimethyl amine or triethy amine, with ammonia being preferred.

It is preferred that the alkali is used in an amount of 85–105% of the amount required to neutralize the carboxyl groups in the styrenic resin used, When the amount of the alkali is less than 85% of the amount required to neutralize the carboxyl groups in the styrenic resin used, the resultant ink composition may have a pH of less than 6. When the ink composition has a pH of less than 6, the styrenic resin has a reduced solubility in water, and accordingly the resultant ink composition may be uneven. Contrary to the above, when the amount of the alkali is more than 105% of the amount required to neutralize the carboxyl groups in the styrenic resin used, the resultant ink composition may have a pH of more than 8.5. In such an ink composition, the resin may be hydrolyzed at its ester structures to form precipitates, or the basic dye may be decomposed to bring about precipitation or change in color of the ink composition.

A nonvolatile alkali may be contained in the ink composition together with the volatile alkali. The nonvolatile alkali may retain the desirable pH of the ink composition for a long period of time, thereby improving storage stability. The incorporation of the nonvolatile alkali may also be useful to prevent the ink composition from evaporating from a pen tip of a felt pen type writing instrument when it has been left standing for a long time with its cap removed therefrom, and thus secure good writability over a long period, preventing the formed writing from becoming faint. The amount of the nonvolatile alkali is up to 50% of the amount required to neutralize the carboxyl groups in the styrenic resin used. Such a nonvolatile alkali used may include, for example, an alkali metal hydroxide such as sodium hydroxide or potassium hydroxide, or an alkanolamine such as triethanolamine, dimethylmonoethanolamine or monomethyldiethanolamine.

The solvent in the ink composition of the invention is water, preferably ion-exchanged water, and it is used in an amount of 40–85% by weight based on the ink composition.

The ink composition of the invention may contain, if necessary, a water soluble organic solvent to prevent the evaporation of water from the ink composition during storage, and also to improve the solubility of basic dye in the ink composition, The water soluble organic solvent used may include, for example, a (di)alkylene glycol such as ethylene glycol, propylene glycol, diethylene glycol or dipropylene glycol; a monoalkyl ether of (di)alkylene glycol such as ethylene glycol monoethyl ether, ethylene glycol monomethyl ether, diethylene glycol monomethyl ether or propylene glycol monomethyl ether; an aliphatic lower alcohol such as ethanol, isopropyl alcohol, n-propyl alcohol or butanol; and an aliphatic polyhydric alcohol such as glycerine. The water soluble organic solvent may be contained in an amount of up to 40% by weight, and preferably in an amount of 3–30% by weight, based on the ink composition.

In addition to the above, the ink composition of the invention may further contain, if necessary, an antiseptic, an antifungal or a surfactant, either nonionic, anionic or cationic. The cationic surfactant on the one hand has a disadvantage in that it is bonded to carboxyl groups in the styrenic acid to reduce the soluble amount of the resin in the ink composition, however, on the other hand, it is useful for internal plasticization of resin or improvement of water resistance and adhesion of resin to writing surface.

The styrenic resin suitable for use in the invention will be mentioned below together with its molecular weight and acid value.

| Trade Name | Molecular Weight | Acid Value |
| --- | --- | --- |
| Styrene-Acrylic Resins: | | |
| Johncryl 67 | 10000 | 195 |
| Johncryl 678 | 7000 | 200 |
| Johncryl 680 | 3900 | 215 |
| Johncryl 682 | 1600 | 235 |
| Johncryl 550 | 7500 | 200 |
| Johncryl 555 | 5000 | 200 |
| Johncryl 683 | 7300 | 150 |
| Johncryl B-36 | 6800 | 250 |
| (available from S. C. Johnson & Son, Inc., U.S.A.) | | |
| Half-Esterified Styrene-Maleic Acid Resins: | | |
| Hairosu X-200 | 14000 | 190 |
| Hairosu X-201 | 14000 | 200 |
| Hairosu X-203 | 14000 | 220 |
| Hairosu X-205 | 9000 | 205 |
| Hairosu X-220 | 14000 | 155 |
| Hairosu X-1202S | 14000 | 190 |
| Hairosu X-1216S | 14000 | 150 |
| (available from Seiko Kagaku K.K., Japan) | | |
| Half-Esterified Styrene-Maleic Acid Resins: | | |
| SMA Resin 1440 | 2500 | 175 |
| SMA Resin 17352 | 1700 | 270 |
| SMA Resin 2625 | 1900 | 220 |
| (available from ARCO Chemical K.K., Japan). | | |

According to the ink composition of the invention, the styrenic resin of a high acid value combines at its partially esterified carboxyl groups ionically with the basic dye to form salts, while the residual carboxyl groups of the resin form salts with the alkali, so that the styrenic resin is dissolved stably in water together with the basic dye, to form an even ink composition.

More specifically, since the styrenic resin used has an acid value much higher than shellac resin which has an acid value usually of 60–80, the amount of basic dye made soluble in water in the presence of the styrenic resin is about two to ten times much as the amount in water in the presence of the shellac resin. Thus, if the ink composition is left standing for a long time, there are formed no precipitates therein, and the resultant ink composition has a good storage stability so that it can be suitably used as an ink composition for a felt pen type writing instrument, The ink composition can write well and propvide writing having a sufficient darkness. However, when writing is formed and dried, the basic dye is combined with the styrenic resin to form a water resistant writing composed of a water insoluble resin film.

The ink composition of the invention can write well not only on a pervious surface but also on an impervious surface, and is suitable for use as a designing ink, a pen writing ink, or an air-brushable drawing ink, as well as an ink composition for a felt pen type writing instrument.

The invention will be set forth in detail with reference to examples, however, the invention is not limited thereto. In the examples, parts are parts by weight.

EXAMPLE 1

A given amount of 28% ammonia water was added to ion-exchanged water, and was added thereto Johncryl 67 under stirring, followed by further stirring for five hours at a temperature of less than 40° C. Thereafter, the resultant mixture was heated to 85° C. and was then maintained at the temperature for one hour, and then cooled to room temperature, to provide a 25% aqueous solution of Johncryl 67 of neutralization degree of 100%, which is referred to as the resin solution 1.

A given amount of ion-exchanged water and sodium benzoate were added to the resin solution 1, to provide a matched resin solution 1.

A basic dye and ethylene glycol were added under stirring to water (and if necessary, heated to a temperature up to about 90° C.) and dissolved evenly therein to provide a dye solution 1.

The composition of the resin solution 1, dye solution 1 and matched resin solution 1 are indicated below.

| Resin Solution 1 | |
|---|---|
| Ion-exchanged water | 69.7 parts |
| 28% ammonia water | 5.3 parts |
| Johncryl 67 | 25.0 parts |
| Dye Solution 1 | |
| Ethylene glycol | 5.0 parts |
| Ion-exchanged water | 44.6 parts |
| C.I. Basic Violet 10 | 0.4 parts |
| Matched Resin Solution 1 | |
| Ion-exchanged water | 9.0 parts |
| Sodium benzoate | 1.0 parts |
| Resin solution 1 | 40.0 parts |

The dye solution 1 was added under stirring to the matched resin solution 1 in an equal weight ratio, and then the mixture was stirred at 50° C. for one hour, to provide a rose color drawing ink of a pH of 7.8.

EXAMPLE 2

A dye solution 2 was prepared in the same manner as in the example 1.

| Dye Solution 2 | |
|---|---|
| Ethylene glycol | 20.0 parts |
| Ion-exchanged water | 27.0 parts |
| C.I. Basic Violet 3 | 3.0 parts |

The above dye solution 2 was used in piece of the dye solution 1, and otherwise in the same manner as in the example 1, a violet color sign pen ink was prepared of a pH of 7.6.

EXAMPLE 3

A 25% aqueous solution of Johncryl B-36 having a neutralization degree of 90% was prepared as a resin solution 2 in the same manner as in the preparation of the resin solution 1, and using the same, a matched resin solution 2 was prepared. A dye solution 3 was also prepared in the same manner as in the example 1.

| Resin Solution 2 | |
|---|---|
| Ion-exchanged water | 68.9 parts |
| 28% ammonia water | 6.1 parts |
| Johncryl B-36 | 25.0 parts |
| Dye Solution 3 | |
| Ethylene glycol | 5.0 parts |
| Ion-exchanged water | 44.4 parts |
| C.I. Basic Green 4 | 0.4 parts |
| C.I. Basic Yellow 65 | 0.2 parts |
| Matched Resin Solution 2 | |
| Ion-exchanged water | 9.0 parts |
| Sodium benzoate | 1.0 parts |
| Resin solution 1 | 40.0 parts |

The above dye solution 3 was added under stirring to the matched resin solution 2 in an equal weight ratio, and then the mixture was stirred at 50° C. for one hour, to provide a green color designing ink of a pH of 7.3.

EXAMPLE 4

A dye solution 4 was prepared in the same manner as in the example 1.

| Dye Solution 4 | |
|---|---|
| Ethylene glycol | 15.0 parts |
| Ethylene glycol monomethyl ether | 10.0 parts |
| Ion-exchanged water | 21.0 parts |
| C.I. Basic Green 1 | 2.0 parts |
| C.I. Basic Yellow 40 | 1.5 parts |

Using the dye solution 4 and the matched resin solution 2, a green color sign pen ink of a pH of 6.9 was prepared in the same manner as in the example 1.

EXAMPLE 5

A 25% aqueous solution of Hairosu X-203 having a neutralization degree of 105% was prepared as a resin solution 3 in the same manner as in the example 1. Using this resin solution 3, a matched resin solution 3 was prepared in the same manner as in the example 1. A dye solution 5 having the composition below was also prepared.

| Resin Solution 3 | |
|---|---|
| Ion-exchanged water | 68.0 parts |
| 28% ammonia water | 4.8 parts |
| Triethanolamine | 2.2 parts |
| Hairosu X-203 | 25.0 parts |

The resin solution 3 had an ammonia/triethanolamine molar ratio of 5/15.

| Dye Solution 5 | |
|---|---|
| Ethylene glycol | 5.0 parts |
| Ion-exchanged water | 44.2 parts |
| C.I. Basic Red 1 | 0.5 parts |
| C.I. Basic Yellow 40 | 0.3 parts |
| Matched Resin Solution 3 | |
| Ion-exchanged water | 9.0 parts |
| Sodium benzoate | 1.0 parts |
| Resin solution 3 | 40.0 parts |

The above dye solution 5 was added under stirring to the matched resin solution 3 tn an equal weight ratio, and then the mixture was stirred at 50° C. for one hour, to provide a red color designing ink of a pH of 8.4.

EXAMPLE 6

A dye solution 6 was prepared in the same manner as in the example 1.

| Dye Solution 6 | |
| --- | --- |
| Ethylene glycol | 25.0 parts |
| Ion-exchanged water | 22.0 parts |
| C.I. Basic Red 12 | 2.0 parts |
| C.I. Basic Yellow 65 | 1.0 parts |

Using the dye solution 6 and the matched resin solution 3, a red color sign pen ink of a pH of 8.1 was prepared in the same manner as in the example 1.

EXAMPLE 7

A 25% aqueous solution of Johncryl 680 having a neutralization degree of 100% was prepared as a resin solution 4 in the same manner as in the example 1.

| Resin Solution 4 | |
| --- | --- |
| Ion-exchanged water | 65.0 parts |
| 28% ammonia water | 2.9 parts |
| Triethanolamine | 7.1 parts |
| Johncryl 680 | 25.0 parts |

The resin solution 4 had an ammonia/triethanolamine molar ratio of 50/50.

The resin solution 4 was mixed with propylene glycol and ion-exchanged water, and a basic dye was added to the resultant solution, to provide an ink composition below. The composition was stirred at 60° C. for about two hours, and insoluble materials Here removed by flirtation, to provide a blue color designing ink of a pH of 7.9.

| Ink Composition 1 | |
| --- | --- |
| Propylene glycol | 3.0 parts |
| Ion-exchanged water | 66.4 parts |
| Resin solution 4 | 30.0 parts |
| C.I. Basic Blue 26 | 0.6 parts |

EXAMPLE 8

A blue color ink composition 2 of a pH of 7.7 as prepared in the same manner as in the example 7. This ink composition is useful as a sign pen ink.

| Ink Composition 2 | |
| --- | --- |
| Propylene glycol | 15.0 parts |
| Ion-exchanged water | 52.5 parts |
| Resin solution 4 | 30.0 parts |
| C.I. Basic Blue 7 | 2.5 parts |

EXAMPLE 9

A brown color ink composition 3 of a pH of 6.5 was prepared in the same manner as in the example 7. This ink composition is useful as a sign pen ink.

| Ink Composition 3 | |
| --- | --- |
| Ethylene glycol | 15.0 parts |
| Ion-exchanged water | 52.5 parts |
| Resin solution 2 | 30.0 parts |
| C.I. Basic Orange 30 | 2.3 parts |
| C.I. Basic Violet 11 | 0.2 parts |

EXAMPLE 10

A yellow color ink composition 4 of ape of 8.3 was prepared in the same manner as in the example 7. This ink composition is useful as a sign pen ink.

| Ink Composition 4 | |
| --- | --- |
| Ethylene glycol | 17.0 parts |
| Ion-exchanged water | 45.0 parts |
| Resin solution 3 | 35.0 parts |
| C.I. Basic Yellow 35 | 3.0 parts |

COMPARATIVE EXAMPLE 1

A comparative resin solution 1 containing Johncryl B-36 was prepared in the manner as in the example 1.

| Comparative Resin Solution 1 | |
| --- | --- |
| Ion-exchanged water | 70.3 parts |
| 28% ammonia water | 7.4 parts |
| Johncryl B-36 | 25.0 parts |

The comparative resin solution 1 was used in place of the resin solution 2 in the example 3, and otherwise in the same manner as in the example 3, a blue color designing ink was prepared. This ink composition has found to become pale olive green when it was left standing at 40° C. for one month.

Water Resistance of Ink Compositions

A conventional ink composition containing a direct dye, a basic dye or a pigment as a colorant was prepared, and the water resistance of writing formed with them was compared with the water resistance of writing formed the ink composition of the invention. The ink composition 2 was used as a representative of the invention, Writing was formed on paper and sprayed with water. After the writing was dried, it was checked if the writing got blurred (spray test). As a further test, writing was left standing under a relative humidity of 90% for one day, and then it was checked if the writing got blurred or permeated through the paper to the back (high humidity test).

The following conventional ink compositions were prepared and subjected to the above tests.

For the production of a pigment ink composition, the following pigment base was first prepared.

| Pigment Base | |
| --- | --- |
| Johncryl 62 | 30.0 parts |
| Color Black SB-5*) | 22.5 parts |
| Ethylene glycol | 10.0 parts |
| Ion-exchanged water | 37.5 parts |

*)Carbon black available from Degussa, Germany

Using the above pigment base, a pigment ink composition of the composition below was prepared.

| Pigment base | 33.3 parts |
| --- | --- |

-continued

| | | |
|---|---|---|
| Johncryl 62 | 11.3 | parts |
| Neocol YSK*) | 0.4 | parts |
| Ethylene glycol | 3.0 | parts |
| Ion-exchanged water | 52.0 | parts |

*)Sodium dialkyl sulfosuccinate available from Dai-Ichi Kogyo Seiyaku K.K., Japan A conventional direct ink composition and a conventional basic dye ink composition were prepared of which compositions were as follows.

| Direct Dye Ink Composition | | |
|---|---|---|
| C.I. Direct Black 19 | 9.0 | parts |
| Triethanolamine | 1.0 | parts |
| Ethylene glycol | 25.0 | parts |
| Ion-exchanged water | 65.0 | parts |
| Basic Dye Ink Composition | | |
| C.I. Basic Violet 1 | 4.0 | parts |
| Ethylene glycol | 30.0 | parts |
| Ion-exchanged water | 66.0 | parts |

Spray Test

The pigment ink composition is originally excellent in water resistance, as well known, and the ink composition of the invention was found to have substantially the same water resistance in the spray test as the pigment ink composition. However, the basic dye ink composition and the direct ink composition were found inferior in the water resistance in the spray test to the above two ink compositions.

High Humidity Test

The ink composition of the invention was found to have substantially the same water resistance as the pigment ink composition. The ink composition containing a direct dye as a colorant was also found comparatively water resistant. However, the ink composition containing a basic dye as a colorant was found very poor in water resistant. The writing was found to permeate through the paper to the back.

What is claimed is:

1. A water base ink composition for writing or drawing which consists essentially of water as a solvent, a carboxyl group containing styrenic resin having an average molecular weight of 1500–30000 and an acid value of 150–300, in an amount of 2–20% by weight, a basic dye in an amount of 0.1–80 parts by weight in relation to 100 parts by weight of the styrenic resin, and an alkali which is volatile at normal temperatures in such an amount as to adjust the ink composition to a pH in the range of 6 to 8.5.

2. The ink composition as claimed in claim 1 wherein the styrenic resin is a half-esterified styrene-maleic acid resin.

3. The ink composition as claimed in claim 1 wherein the styrenic resin is a styrene-acrylic acid resin.

4. The ink composition as claimed in claim 1 wherein the alkali is contained in such an amount as neutralize the amount of 85–105% of the carboxyl groups of the styrenic resin.

5. The ink composition as claimed in claim 1 wherein the alkali is ammonia water.

6. The ink composition as claimed in claim 1 which further contains a water soluble organic solvent selected from the group consisting of a (di)alkylene glycol and a monoalkyl either of a (di)alkylene glycol.

7. The ink composition as claimed in claim 1 which contains at least one of the styrenic resins selected from the group consisting of a half-esterified styrene-maleic acid resin and a styrene-acrylic acid resin, having an average molecular weight of 1500–30000 and an acid value of 150–300, in an amount of 5–15% by weight and the basic dye in an amount of 3–50 parts by weight in relation to 100 parts by weight of the styrenic resin.

8. The ink composition as claimed in claim 7 which contains ammonia water.

9. The ink composition as claimed in claim 7 wherein the styrenic resin has an average molecular weight of 1800–10000 and an acid value of 180–250.

10. The ink composition as claimed in claim 7 for use in a felt pen type writing instrument.

11. The ink composition as claimed in claim 8 for use in a felt pen type writing instrument.

12. The ink composition as claimed in claim 9 for use in a felt pen type writing instrument.

* * * * *